United States Patent
Wessman et al.

(10) Patent No.: US 10,828,611 B2
(45) Date of Patent: Nov. 10, 2020

(54) METHOD FOR DETERMINING FLOW VELOCITY OF A LIQUID IN A CIRCULATION CHANNEL

(71) Applicant: Xylem IP Management S.à r.l., Senningerberg (LU)

(72) Inventors: Martin Wessman, Solna (SE); Jürgen Mökander, Sollentuna (SE); Lars Uby, Spånga (SE)

(73) Assignee: Xylem IP Management S.à r.l., Senningerberg (LU)

( * ) Notice: Subject to any disclaimer, the term of this patent is extended or adjusted under 35 U.S.C. 154(b) by 195 days.

(21) Appl. No.: 16/304,772

(22) PCT Filed: May 22, 2017

(86) PCT No.: PCT/EP2017/062244
§ 371 (c)(1),
(2) Date: Nov. 27, 2018

(87) PCT Pub. No.: WO2017/207318
PCT Pub. Date: Dec. 7, 2017

(65) Prior Publication Data
US 2020/0156029 A1    May 21, 2020

(30) Foreign Application Priority Data
May 30, 2016 (EP) .................................. 16171941

(51) Int. Cl.
*B01F 15/00* (2006.01)
*B01F 3/04* (2006.01)
(Continued)

(52) U.S. Cl.
CPC .... *B01F 15/00201* (2013.01); *B01F 3/04241* (2013.01); *B01F 5/102* (2013.01);
(Continued)

(58) Field of Classification Search
CPC ............ C02F 2103/00; C02F 2103/003; C02F 2103/007; C02F 2201/00;
(Continued)

(56) References Cited

U.S. PATENT DOCUMENTS

| 8,339,093 B2 * | 12/2012 | Lu | .......................... H02P 23/00 318/807 |
| 2007/0221552 A1 * | 9/2007 | Denney | .............. B01D 21/2494 210/85 |
| 2015/0008191 A1 * | 1/2015 | Ladouceur | .......... B01F 3/04609 210/758 |

FOREIGN PATENT DOCUMENTS

| JP | 11216487 A * | 8/1999 | ................ C02F 3/14 |
| JP | 11216487 A | 8/1999 | |
| WO | 2015193783 A1 | 12/2015 | |

OTHER PUBLICATIONS

International Search Report and Written Opinion for International Application No. PCT/EP2017/062244, dated Jul. 3, 2017—9 pages.

* cited by examiner

*Primary Examiner* — Antony M Paul
(74) *Attorney, Agent, or Firm* — RatnerPrestia

(57) ABSTRACT

A treatment plant and method for controlling a treatment plant suitable for treatment of wastewater. The treatment plant includes a circulation channel housing liquid, a submersible flow generating machine arranged in the circulation channel and generating a liquid flow along the circulation channel, and a control unit that is operatively connected to the flow generating machine. The flow generating machine is driven in operation by the control unit. The method includes the steps of: driving the flow generating machine at a nominal speed, decreasing the rotational speed of the flow generating machine from the set nominal speed, detecting the rotational speed at which the torque of the flow gener- (Continued)

ating machine is equal to a predetermined threshold, and determining the flow velocity of the liquid at the flow generating machine based on a predetermined relationship between the rotational speed of the flow generating machine and the flow velocity of the liquid.

12 Claims, 1 Drawing Sheet

(51) Int. Cl.
    *B01F 5/10*     (2006.01)
    *C02F 3/12*     (2006.01)

(52) U.S. Cl.
    CPC ...... *C02F 3/1284* (2013.01); *C02F 2209/006* (2013.01); *C02F 2209/22* (2013.01); *C02F 2209/40* (2013.01)

(58) Field of Classification Search
    CPC ......... C02F 2201/4612; C02F 2301/02; C02F 3/00; C02F 3/12; C02F 3/006; H02P 1/00; H02P 1/04; H02P 1/46; H02P 3/00; H02P 5/00; H02P 7/00; H02P 23/00; H02P 27/00; H02P 27/04; H02P 27/06; H02P 5/46; H02P 2205/07; H02P 27/026; B01F 3/04765; B01F 3/04773
    USPC .......... 318/400.01, 700, 701, 721, 727, 779, 318/799, 430, 432
    See application file for complete search history.

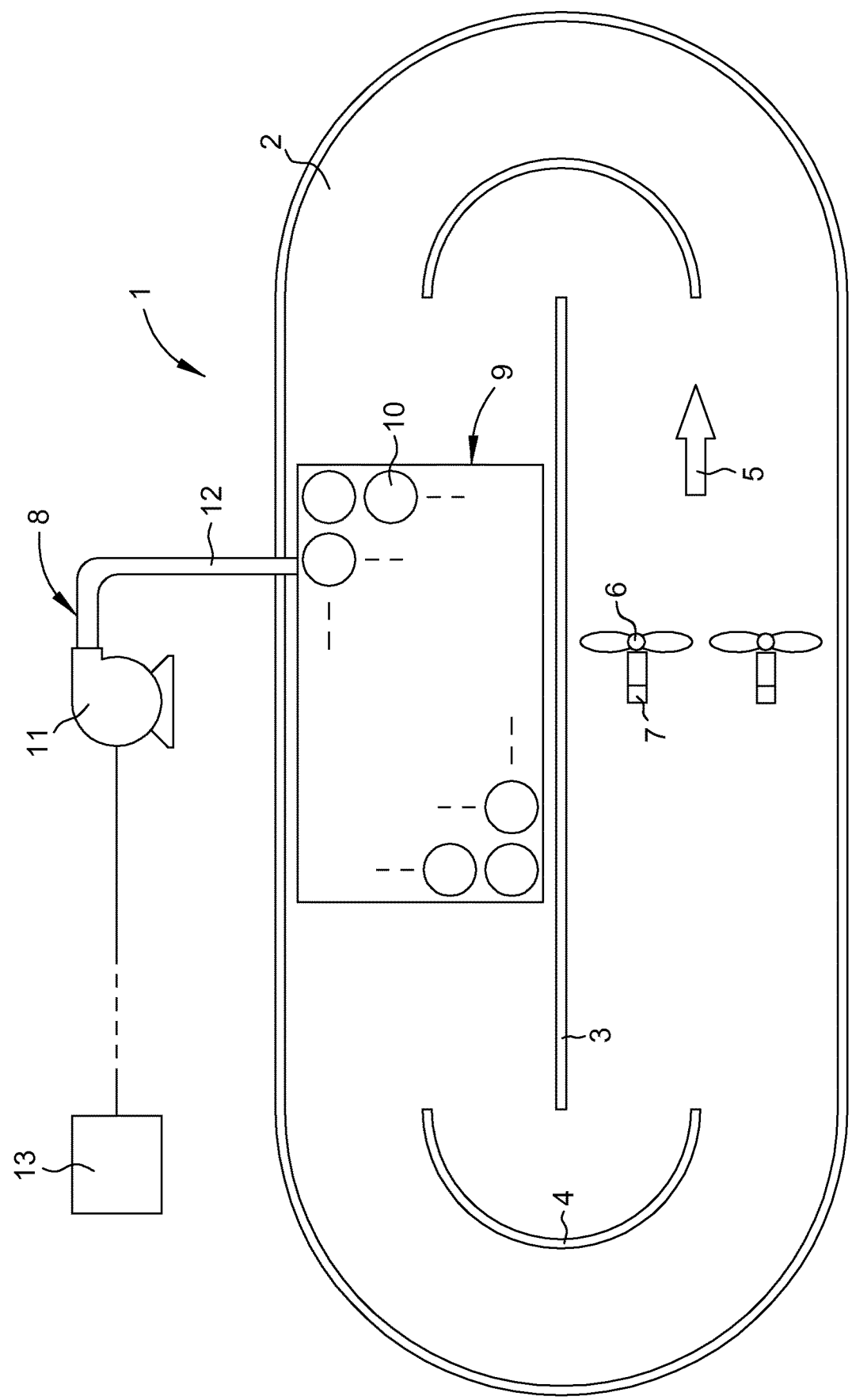

METHOD FOR DETERMINING FLOW VELOCITY OF A LIQUID IN A CIRCULATION CHANNEL

CROSS-REFERENCE TO RELATED APPLICATIONS

This patent application is a U.S. National Phase Patent Application of PCT Application No.: PCT/EP2017/062244, filed May 22, 2017, which claims priority to European Patent Application No. 16171941.4, filed May 30, 2016, each of which is incorporated by reference herein in its entirety.

TECHNICAL FIELD OF THE INVENTION

The present invention relates in general to the field of treatment plants suitable for biological treatment of liquid, such as wastewater/sewage, and methods for controlling such treatment plants. Further, the present invention relates specifically to the field of methods for determining a flow velocity of the liquid in the treatment plant. The treatment plant comprises a circulation channel configured to house said liquid, a submersible flow generating machine arranged in the circulation channel and configured to generate a liquid flow along the circulation channel, and a control unit that is operatively connected to said flow generating machine, wherein the flow generating machine is configured to be driven in operation by said control unit.

BACKGROUND OF THE INVENTION

A circulation channel, also known as a ring channel or a racetrack, is usually an upwardly open endless basin that is used during biological treatment or oxidation of a liquid, especially wastewater/sewage. The liquid is made to flow along the circulation channel and is thereby made to pass different zones in the circulation channel.

During such biological treatment the wastewater is usually purified from nitrogen and biological material by having micro organisms breaking down the biological material into carbon dioxide and water, and by having bacteria transforming the water-bound nitrogen to aerial nitrogen. Purified wastewater is released back into the nature and in the case the water-bound nitrogen is not eliminated there is a risk for eutrophication in the natural watercourses, and due to the fact that the biological material is consuming considerable amounts of oxygen watercourses deficient in oxygen are generated if insufficiently purified water is released back into the nature. The breaking down of the biological material is stimulated by adding large amounts of oxygen to the wastewater by means of one or more aeration sectors, and the elimination of the water-bound nitrogen takes place in the circulation channel in areas without added oxygen or in separate basins without added oxygen and/or in areas/basins in which the dissolved oxygen level is low enough for the process to occur.

Flow generating machines/mixers are used in circulation channels in order to mix the liquid/wastewater in order to obtain an as homogenous liquid mixture as possible, in order to keep the biological material suspended in the liquid, as well as in order to generate a liquid flow that circulates/flows along the circulation channel as an endless stream.

In some known processes of liquid treatment it is requested that the flow velocity of the liquid along the circulation channel is kept at a predetermined level, or that the flow velocity is known in order to control other operational measures/activities, such as amount of oxygen to be supplied. In a theoretical circulation channel having only one flow generating machine and homogenous liquid, this is easily fulfilled by operating the flow generating machine at a constant operational speed. However, in reality the liquid is not homogenous over time and thereto the treatment plant comprises equipment that are arranged in the circulation channel and that have effect on the momentum of the flowing liquid in positive direction or in negative direction. A change in the momentum of the liquid flow entails that the velocity of the liquid flow is effected/changed. The effect of this equipment may also be variable over time due to varying operational measures, i.e. varying amount of oxygen supplied. Based on the fact that the status of the incoming wastewater is changed over time, varying amount of added oxygen over time, and modified intensity entails that the velocity of the liquid flow is effected.

In order to monitor the instantaneous flow velocity of the liquid it is known to use expensive external speed sensors that are susceptible to disturbances from the liquid/wastewater and require regular maintenance.

OBJECT OF THE INVENTION

The present invention aims at obviating the aforementioned disadvantages and failings of previously known methods for controlling treatment plants, and at providing an improved method for determining a flow velocity of a liquid, such as wastewater, in a treatment plant suitable for treatment of the liquid. A primary object of the present invention is to provide an improved method of the initially defined type which entail that the flow velocity can be determined without using external speed sensors. External speed sensors suffer from the drawbacks that they are expensive and require monitoring and maintenance as they are susceptible to disturbances and thereby risk providing incorrect information.

SUMMARY OF THE INVENTION

According to the invention at least the primary object is attained by means of the initially defined method and treatment plant having the features defined in the independent claims. Preferred embodiments of the present invention are further defined in the dependent claims.

According to a first aspect of the present invention, there is provided a method of the initially defined type, which is characterized by the steps of: driving, by means of the control unit, the flow generating machine at a nominal speed, decreasing, by means of the control unit, the rotational speed of the flow generating machine from the set nominal speed, detecting, by means of the control unit, the rotational speed at which the torque of the flow generating machine is equal to a predetermined threshold, and determining the flow velocity of the liquid at the flow generating machine based on a predetermined relationship between the rotational speed of the flow generating machine and the flow velocity of the liquid.

According to a second aspect of the present invention, there is provided a treatment plant of the initially defined type, which is characterized in that the control unit is configured to perform the inventive method.

Thus, the present invention is based on the insight that by means of a control unit the flow generating machine can be used to determine the flow velocity of the liquid.

In a preferred embodiment of the present invention, the predetermined threshold of the torque is equal to or less than 10% of the nominal torque of the flow generating machine.

According to a preferred embodiment, the submersible flow generating machine and the control unit are assembled into a single unit submersible mixer machine.

Further advantages with and features of the invention will be apparent from the other dependent claims as well as from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein the sole FIGURE is a schematic illustration of an inventive treatment plant.

DETAILED DESCRIPTION OF THE INVENTION

Reference is made to the FIGURE. The present invention relates to a treatment plant, generally designated 1, suitable for treatment/purification of liquid, such as wastewater, comprising biological matter. The treatment plant 1 comprises a circulation channel 2, also known as ring channel or race track. Said circulation channel 2 is an endless basin configured to house the liquid to be treated.

In the disclosed embodiment the circulation channel 2 is constituted by an oblong basin having rounded ends and comprising a centrally located longitudinal divider 3, the circulation channel 2 obtaining two parallel straight channel segments that are connected to each other by means of two direction changing/semi circular channel segments. The direction changing channel segments comprises in the disclosed embodiment guide walls 4 that facilitates the change of direction of the liquid flow. It shall be pointed out that circulation channels may present any other conceivable shape, for instance annular shape or serpentine shape, and thus the circulation channel may comprise several straight and direction changing channel segments, respectively, or may present an entirely circular/elliptic track shape.

The circulation channel 2 is configured to house liquid/wastewater up to a predetermined filling height/liquid level, even thus the actual liquid level during operation may be below as well as above said filling height without the present invention being effected significantly. The wastewater is purified either continuously or batch wise in an inventive treatment plant 1 and by having a wastewater volume reaching up to said predetermined filling height an optimal utilization of the treatment plant 1 is obtained. A typical filling height is about 3-8 meters. During continuous treatment liquid is supplied continuously to the circulation channel 2 at the same time as liquid is removed continuously from the circulation channel 2. The input and the output during continuous treatment is a fraction of the circulating flow, usually about $1/30$-$1/20$ of the circulating flow. The circulation channel 2 is configured to have a predetermined flow direction, schematically shown by means of the arrow 5, along which the liquid is intended to flow.

Thereto the inventive treatment plant 1 comprises at least one submersible flow generating machine 6 arranged in the circulation channel 2, usually two or more flow generating machines are located next to each other. The flow generating machine 6 is configured to generate a liquid flow flowing along said circulation channel 2, and may be constituted by one or more submergible mixers. The flow generating machine 6, is often so-called slowly operated mixer having a propeller rotating at a rpm in the area less than 100 rpm, usually in the area 20-50 rpm. In some installations the circulation channel 2 comprises flow generating machines 6 at two or more locations, which preferably are mutually equidistantly arranged along the circulation channel 2. Preferably the flow generating machine 6 shall be located at a distance from a direction changing channel segment of the circulation channel 2 such that a counter force from the walls of the circulation channel 2 having effect on the flow generation machine 6 and negatively effecting the generation of the liquid flow are as low as possible or does not arise.

The inventive treatment plant 1 also comprises a control unit 7 (ECU), that is operatively connected to said at least one flow generating machine 6 and wherein the flow generating machine 6 is configured to be driven in operation by the control unit 7. Thus, the control unit 7 is configured to control the rotational speed at which said flow generating machine 6 is to be driven, for instance by controlling the frequency of the current operating the electrical motor of the flow generating machine 6. According to one embodiment, the control unit 7 is constituted by an external control unit. According to a preferred embodiment the control unit 7 and the flow generating machine 6 are assembled into a submersible mixer machine, i.e. a mixer having a built in control unit. The control unit is preferably constituted by a Variable Frequency Drive [VFD].

In the disclosed embodiment the treatment plant 1 comprises an aeration arrangement, generally designated 8, configured to provide a gas flow Q comprising oxygen to the liquid. The aeration arrangement 8 comprises preferably at least one aeration sector 9. The aeration sector 9 is in the disclosed embodiment arranged in the middle of a straight channel segment, however, also other locations are conceivable such as preferably in the beginning of a straight channel segment or along the entire length of a straight channel segment and/or in a direction changing channel segment. Said at least one aeration sector 9 is preferably arranged at the bottom of the circulation channel 2 and is configured to provide a gas flow Q from the aeration arrangement 8 to the liquid, in order to transfer oxygen ($O_2$) from the gas to the waste water/liquid. The gas flow Q is constituted by oxygen containing gas such as air, other oxygen containing gas mixture or pure oxygen. The aeration sector 9 is for instance constituted by a large number of diffusors or aerator members/units 10, preferably so-called fine bubble aerators, which together cover the entire or main part of the width of the circulation channel 2. The aeration arrangement 8 thereto comprises at least one blowing machine 11 that provides gas to the aeration sector 9 via a pipe system 12, the blowing machine 11 is preferably operatively connected to an external control unit 13 whereupon the operational speed/rotational speed of the blowing machine 11 can be adjusted/altered. It shall be pointed out that the control unit denoted 7 can be constituted by the external control unit denoted 13.

In the optimal embodiment a homogenous and uniform liquid flow reaches the flow generating machine 6 and the liquid flow is free from gas bubbles and gas flow induced currents. Thereto it is preferred that the aeration sector 9 is not located to close to the outlet of the circulation channel 2, in order to prevent that gas bubbles or to large amount of dissolved oxygen is carried to the next process step in the treatment plant 1.

It is essential for the present invention that the control unit 7 of the inventive treatment plant 1 is configured to perform the inventive method, and that the method comprises the steps of driving the flow generating machine 6 at a nominal speed, decreasing the rotational speed of the flow generating machine 6 from the nominal speed, detecting the rotational speed at which the torque of the flow generating machine 6 is equal to a predetermined threshold, and determining the flow velocity of the liquid at the flow generating machine 6 based on a predetermined relationship between the rotational speed of the flow generating machine 6 and the flow velocity of the liquid.

In this document, the nominal speed of the flow generating machine 6, also known as operational speed, is the propeller rotational speed at a preset application design point. The preset application design point is optimized to match the design of the specific treatment plant 1 and circulation channel 2, and to match the amount and composition of the influent wastewater. A direct equivalent measure to the propeller rotational speed is the output frequency from the control unit 7.

In order to decrease the rotational speed of the flow generating machine 6 the control unit 7 is configured to decrease the output frequency.

The torque of the flow generating machine 6 is preferably determined in the control unit 7 by dividing the instantaneous output power of the flow generating machine 6 with $2\pi$ and with the instantaneous rotational speed of the flow generating machine 6. The output power is the mechanical power delivered from the shaft of the flow generating machine 6. It shall be pointed out that the step of detecting the rotational speed at which the torque of the flow generating machine 6 is equal to a predetermined threshold, in practice involves detecting the rotational speed when passing the torque threshold.

The relationship between the rotational speed of the flow generating machine 6 and the flow velocity of the liquid induced by the flow generating machine 6 is predetermined in a laboratory, at a test plant, by computer simulations (CFD), etc. Thus, a flow sensor is used to determine the flow velocity of the liquid when the torque of the flow generating machine 6 is equal to the threshold and this flow velocity is mapped against the rotational speed of the flow generating machine 6. This relationship is dependent on the type and size of the flow generating machine 6, and the nature of the liquid/wastewater is in this context considered to be constant and of less importance.

According to a preferred embodiment the method, after the step of driving the flow generating machine 6 at a nominal speed, comprises the step of monitoring the torque of the flow generating machine 6 when driven at said nominal speed. By monitoring the torque at said nominal speed, the control unit 7 is able to determine the nominal torque of the flow generating machine 6. Thus, the nominal torque is preferably determined in the control unit 7 by dividing the output power of the flow generating machine 6 when driven at the nominal speed with $2\pi$ and with the nominal speed of the flow generating machine 6.

According to a preferred embodiment the predetermined threshold of the torque of the flow generating machine 6 is equal to or less than 10% of the nominal torque of the flow generating machine 6, preferably equal to or less than 5%, and most preferably equal to or less than 3%. The threshold can also be negative. According to an alternative embodiment the predetermined threshold of the torque is equal to zero Nm.

Another interesting condition, which should be considered as alternative/equivalent to the above thresholds, when decreasing the rotational speed of the flow generating machine 6 is to detect/determine the negative torque of the flow generating machine 6 when the rotational speed of the flow generating machine 6 is equal to zero. Thereafter determine the flow velocity of the liquid at the flow generating machine 6 based on a predetermined relationship between the torque of the flow generating machine 6 at zero rotational speed and the flow velocity of the liquid.

According to a preferred embodiment the method, after the step of driving the flow generating machine 6 at a nominal speed, comprises the step of identifying the occurrence of a steady state of the liquid flow along the circulation channel 2. Due to the inertia of the liquid/wastewater it takes some time after the flow generating machine 6 is activated or the nominal speed is changed before a steady state of the liquid flow is reached, and the steady state should be reached in order to obtain best accuracy when determining the flow velocity. A typical time period from activation of the flow generating machine 6 until steady state condition of the liquid flow, i.e. the acceleration of the liquid in the circulation channel 2 from standstill to the flow velocity to be determined, is in the range 5-15 minutes and usually about 10 minutes.

Preferably, the step of identifying the occurrence of a steady state of the liquid flow along the circulation channel 2, is performed by identifying a steady state of the torque of the flow generating machine 6. Thus, the steady state level of the torque is equal to the nominal torque.

The time period for the step of ramping down/decreasing the rotational speed of the flow generating machine 6 from the set nominal speed, shall be far less than the time needed to accelerate the liquid from standstill to steady state in order not to have negative effect on the flow velocity of the liquid. The ramping down time period is equal to or less than 30 seconds, preferably equal to or less than 10 seconds, and most preferably equal to or less than 5 seconds.

The essence of the invention is the combination of flow generating machine and control unit, especially when assembled into a single unit submersible mixer machine. Such a combination of flow generating machine and control unit may be sold separately and be installed into an existing circulation channel. A control unit configured to perform the inventive method together with a flow generating machine is not an off-the-shelf control unit.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

It shall also be pointed out that even thus it is not explicitly stated that features from a specific embodiment may be combined with features from another embodiment, the combination shall be considered obvious, if the combination is possible.

The invention claimed is:

1. A method for determining a flow velocity of a liquid in a wastewater treatment plant, the treatment plant including a circulation channel for housing the liquid, a submersible flow generating machine arranged in the circulation channel for generating a liquid flow along the circulation channel, and a control unit that is operatively connected to said flow generating machine for operatively driving the flow generating machine, the method comprising the steps of:

(a) driving, by means of the control unit, the flow generating machine at a set nominal speed,
(b) decreasing, by means of the control unit, a rotational speed of the flow generating machine from the set nominal speed,
(c) detecting, by means of the control unit, the rotational speed at which a torque of the flow generating machine is equal to a predetermined threshold, and
(d) determining the flow velocity of the liquid at the flow generating machine based on a predetermined relationship between the rotational speed of the flow generating machine and the flow velocity of the liquid.

2. The method according to claim 1, wherein following step (a), the method further comprises the step of monitoring, by means of the control unit, the torque of the flow generating machine when driven at said set nominal speed.

3. The method according to claim 1, wherein following step (a), the method further comprises the step of identifying, by means of the control unit, an occurrence of a steady state of the liquid flow along the circulation channel.

4. The method according to claim 3, wherein the identifying step is performed by identifying a steady state of the torque of the flow generating machine.

5. The method according to claim 1, wherein the predetermined threshold of the torque is equal to or less than 10% of a nominal torque of the flow generating machine.

6. The method according to claim 1, wherein the predetermined threshold of the torque is equal to or less than 5% of a nominal torque of the flow generating machine.

7. The method according to claim 1, wherein the predetermined threshold of the torque is equal to zero Nm.

8. A wastewater treatment plant configured for treating a liquid, said wastewater treatment plant comprising:
   a circulation channel configured to house a liquid,
   a submersible flow generating machine arranged in the circulation channel and configured to generate a liquid flow along the circulation channel, and
   a control unit that is operatively connected to said flow generating machine for operatively driving the flow generating machine,
   wherein the control unit is configured to (i) drive the flow generating machine at a set rotational speed, (ii) decrease the rotational speed of the flow generating machine from the set rotational speed, (iii) detect the rotational speed at which a torque of the flow generating machine is below a predetermined threshold, and (iv) determine a flow velocity of the liquid at the flow generating machine based on a predetermined relationship between the rotational speed of the flow generating machine and the flow velocity of the liquid.

9. The wastewater treatment plant according to claim 8, wherein the control unit is configured to identify an occurrence of a steady state of the liquid flow along the circulation channel.

10. The wastewater treatment plant according to claim 9, wherein the control unit is configured to identify the occurrence of the steady state of the liquid flow along the circulation channel by identifying a steady state of the torque of the flow generating machine.

11. The wastewater treatment plant according to claim 8, wherein the control unit is constituted by a Variable Frequency Drive [VFD].

12. The wastewater treatment plant according to claim 8, wherein the submersible flow generating machine and the control unit are assembled into a submersible mixer machine.

* * * * *